(12) United States Patent
Ogawa et al.

(10) Patent No.: US 12,340,108 B2
(45) Date of Patent: Jun. 24, 2025

(54) METADATA ACCESS AND CONVERSION DURING STORAGE SYSTEM CONTROLLER UPDATE

(71) Applicant: Hitachi, Ltd., Tokyo (JP)

(72) Inventors: Shugo Ogawa, Tokyo (JP); Yoshihiro Yoshii, Tokyo (JP); Ryosuke Tatsumi, Tokyo (JP); Tomohiro Yoshihara, Tokyo (JP); Yusuke Nonaka, Tokyo (JP); Hiroshi Miki, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 94 days.

(21) Appl. No.: 18/370,014

(22) Filed: Sep. 19, 2023

(65) Prior Publication Data

US 2024/0256167 A1 Aug. 1, 2024

(30) Foreign Application Priority Data

Jan. 27, 2023 (JP) ................................ 2023-010756

(51) Int. Cl.
*G06F 12/00* (2006.01)
*G06F 3/06* (2006.01)

(52) U.S. Cl.
CPC .......... *G06F 3/0643* (2013.01); *G06F 3/0604* (2013.01); *G06F 3/0673* (2013.01)

(58) Field of Classification Search
None
See application file for complete search history.

(56) References Cited

U.S. PATENT DOCUMENTS

2022/0100424 A1    3/2022    Tatsumi et al.

FOREIGN PATENT DOCUMENTS

JP    2022-055614 A    4/2022

*Primary Examiner* — Daniel D Tsui
(74) *Attorney, Agent, or Firm* — PROCOPIO, CORY, HARGREAVES & SAVITCH LLP

(57) ABSTRACT

Performance deterioration of a storage system is prevented. A storage controller includes one or more processors, and one or more memories configured to store one or more programs to be executed by the one or more processors. The one or more processors are configured to execute conversion of converting metadata before conversion for controlling the storage system into metadata after conversion in a format corresponding to a new controller newly installed in the storage system, execute control of switching an access destination between the metadata before conversion and the metadata after conversion according to an access control code during the conversion, and access the metadata before conversion without using the access control code before start of the conversion.

7 Claims, 12 Drawing Sheets

CONFIGURATION OF PROGRAM AREA BEFORE SOFTWARE UPDATE

CONFIGURATION OF PROGRAM AREA AFTER SOFTWARE UPDATE

METADATA ACCESS AND CONVERSION DURING STORAGE SYSTEM CONTROLLER UPDATE

CLAIM OF PRIORITY

The present application claims priority from Japanese patent application JP 2023-010756 filed on Jan. 27, 2023, the content of which is hereby incorporated by reference into this application.

BACKGROUND OF THE INVENTION

1. Field of the Invention

The present invention relates to a storage system.

2. Description of Related Art

Recently, in order to enhance performance and availability, in many computer systems that require high-reliability data storage, a storage system is used which includes a plurality of storage mediums that store data and a plurality of controllers that execute access processing. Such a storage system has redundancy in control among the plurality of controllers, and can allow an external host to access a storage area even when a part of the controllers stops.

In addition, in recent years, for a storage system including a plurality of controllers, a function of replacing a controller with a new device in a state where access is continuously provided to a host is provided.

By updating hardware of the controller using this function, it is possible to improve access performance and function of a storage without stopping the access from the host. In addition, since each of the storage mediums constituting the storage can be used as it is, as compared with a case of updating the entire storage system, there are advantages that the price of a device required for updating the storage is reduced and copying of data in the storage medium due to the update work of the storage system is not required.

In the update of the controller of the storage system, metadata including control information is converted from an original controller to a new controller. In many cases, in the new controller, an amount of resources required for performance improvement is increased as the hardware is updated. In addition, functional enhancement and improvement of software are also performed. Information required for controlling the controller changes along with the change of the hardware and the software, so that a format of the metadata is changed between generations of the controller. On the other hand, since the storage medium is not updated, it is required to hand over the control information required for accessing the stored data. Therefore, the metadata used by the original controller is converted according to a hardware configuration and software control of the new controller and taken over.

When the metadata held by the storage controller is converted without stopping the access from the host, in particular, in a storage system that requires ensuring redundancy even during the controller update work, the conversion of the metadata and a process on an access request from the host are executed in parallel in the same controller. At this time, while the metadata to be used by the new controller is generated by converting the metadata, in the process on the access request, conversion source metadata is used until the conversion of the metadata is completed, and reference and update occur. Therefore, during a period from when the conversion of the metadata is completed to when handover of the control to the new controller is completed, both the metadata before conversion and new metadata after conversion are present in a memory of the controller that performs the conversion.

In a situation in which the conversion of the metadata is performed without stopping the access from the host and two types of metadata, that is, the conversion source metadata and the new metadata, are present in the memory, it is necessary to refer to and update the metadata according to completion states of the conversion of the metadata and the handover of the control. For example, in a case where the conversion source metadata is updated by the access, when the conversion of the update target metadata is already completed, since it is necessary to reflect the update of the metadata in the new metadata after conversion, it is necessary to update both the original metadata and the new metadata.

On the other hand, when the conversion of the update target metadata is not completed, the update of the metadata can be reflected in the new metadata after conversion by updating only the original metadata. In addition, after the conversion of the metadata is completed, before and after the control of the storage system is taken over to the new controller, it is necessary to switch the metadata used for the access from the original metadata before conversion to the new metadata after conversion.

PTL 1 discloses a technique of adding, for each metadata access part of the control software of a storage system, a function of switching access destination metadata according to a progress situation of conversion to the metadata corresponding to the new controller in the controller update work and a switching situation of the control of the controller. By adding the process of switching the access destination metadata for the metadata access part of the control software, it is possible to respond to the conversion of the metadata format associated with the update of the controller without changing an operation procedure of the control software other than the metadata access.

CITATION LIST

Patent Literature

PTL 1: JP2022-55614A

SUMMARY OF THE INVENTION

In order for each part of the control software of the controller to continue, during the controller update work, the process on the access request from the host without being aware of the situations of the conversion of the metadata and the handover of the control of the controller, it is necessary to add, in each part that accesses the metadata, a process of determining and switching to the access destination metadata. At this time, overhead occurs when condition determination and branching are performed at each access location of the metadata in the control software. In addition, when the process of determining and switching to the access destination metadata is added, the condition determination and the branching are performed at each access location of the metadata regardless of whether the controller is being updated.

That is, when the process of determining and switching to the access destination metadata is added to the control software, in order to allow the access request from the host to be continuously processed even during the controller update work, the overhead occurs even in a state where the controller update work is not performed, and the processing performance deteriorates. Since an execution frequency of the controller update work in the storage system is low, most of time affected by the performance degradation due to the overhead is not related to the controller update, and the performance degradation occurs due to the addition of an unnecessary process.

One aspect according to the invention is a storage system including a controller. The controller includes one or more processors, and one or more memories configured to store one or more programs to be executed by the one or more processors. The one or more processors are configured to execute conversion of converting metadata before conversion for controlling the storage system into metadata after conversion in a format corresponding to a new controller newly installed in the storage system, execute control of switching an access destination between the metadata before conversion and the metadata after conversion according to an access control code during the conversion, and access the metadata before conversion without using the access control code before start of the conversion.

According to the one aspect of the invention, in the storage system, it is possible to perform an installation work of the controller without stopping access from a host and to reduce performance degradation in a state where the installation work of the controller is not performed.

Problems, configurations, and effects other than those described above will be apparent by the description of the embodiments below.

DESCRIPTION OF EMBODIMENTS

Figure 1:
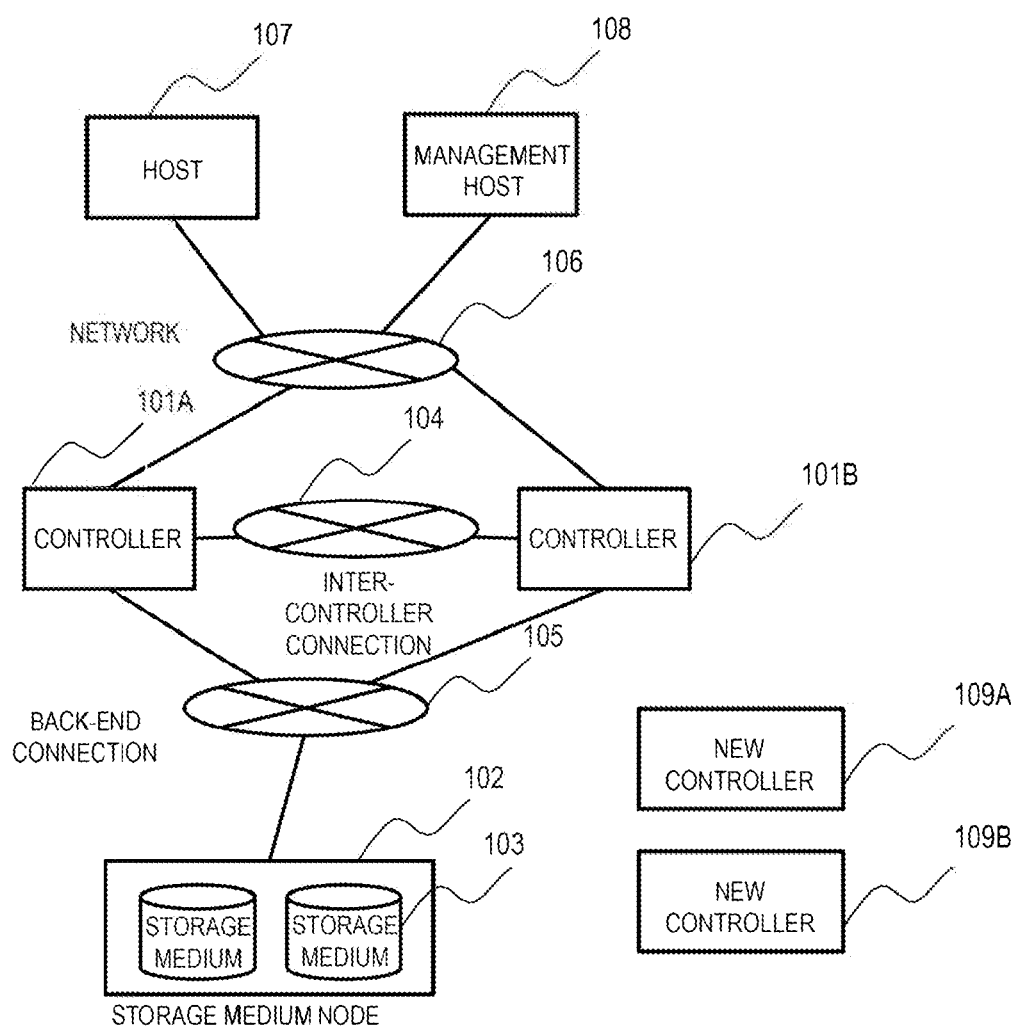
FIG. 1 is a diagram showing a node configuration example of a storage system according to a first embodiment.

Hereinafter, embodiments of the invention will be described with reference to the drawings. In the accompanying drawings, functionally identical elements may be denoted by the same numerals. The accompanying drawings show specific embodiments and examples in accordance with the principle of the invention. These embodiments and examples are provided for understanding of the invention, and should not be construed as limiting the scope of the invention. All of the elements described in the embodiments and examples are not limited to being necessary to solve the problems of the invention.

In one example in the present specification, in order to prevent occurrence of overhead in states other than a state during a controller update work requiring determination and switching of access destination metadata, a process of determining and switching to the access destination metadata is applied to a metadata access part of the control software only in a state in which the controller update work is performed. When the controller update work is not performed, the control software does not necessarily need to handle two kinds of metadata, and the occurrence of overhead is avoided by directly accessing the metadata without determining and switching to the access destination metadata.

Therefore, two types of codes in a state in which a process of determining and switching to the access destination metadata is applied to each metadata access location controlled by an original controller or a new controller and a state in which the process is not applied are prepared. The two types of codes are selectively used such that the code in which the process of determining and switching to the access destination metadata is not applied is used except during the controller update work. The two types of codes are selectively used by switching to, by updating the control software of the controller, a code to be statically executed, or by preparing two types of codes in advance in an operable state and switching to a code to be dynamically executed in a case of performing the controller update work.

In a case of switching to the code to be statically executed, the control software of the controller is updated in a controller update work procedure. A period of updating the control software is different between a case where conversion of the metadata is performed by the original controller and a case where the conversion is performed by a new controller. When the conversion of the metadata is performed by the original controller, before start of the conversion, the control software of the original controller is updated to a code in which the function of determining and switching to the access destination metadata is applied. By performing this procedure, it is not necessary to apply a process that causes overhead until immediately before the controller update work is performed. Therefore, it is possible to avoid performance degradation. In addition, when performing the conversion of the metadata in the new controller, a function of determining and switching to the access destination metadata is applied in advance to the control software of the new controller which is an update destination. After the conversion of the metadata is completed and the control of the storage system is taken over from the controller, the control software of the new controller is updated to the code in which the function of determining and switching to the access destination metadata is not applied, and the occurrence of performance degradation after the update of the controller is completed is avoided.

On the other hand, in a case of switching to the code to be dynamically executed, in the controller that performs the conversion of the metadata, two types of codes are prepared in a state where the controller can execute the two types of codes, that is, a code in which the function of determining and switching to the access destination metadata is applied to the metadata access location in the control software and a code that the function is not applied, it is determined whether the controller is performing the update work, and the code to be executed is selected. By performing, in a unit of code including a plurality of times of metadata access, the selection process of the code to be executed, it is possible to avoid the occurrence of determination and branching each time accessing the metadata. For example, the selection of code to be executed is performed for each module such as functions in control software, thereby performing condition determination and branching in a unit of code including a plurality of times of metadata access, reducing the overhead, and reducing the performance degradation caused by the condition determination and branching.

First Embodiment

The present embodiment describes an example in which in a storage system including a plurality of controllers sharing storage mediums, the controllers are updated without stopping access from a host. The storage mediums constituting the storage system are used continuously are as they even after the controllers are updated.

FIG. 1 is a diagram showing a configuration example of a storage system and a host that issues an access request to the storage system according to a first embodiment.

The storage system includes controllers 101A, 101B, a storage medium node 102, and storage mediums 103 in the storage medium node 102. Each of the storage mediums 103 is also called a storage drive, and may be, for example, an HDD or an SSD. The number of each component of the storage system can be any number.

The controllers 101A, 101B are connected by an inter-controller connection 104, and the controllers 101A, 101B and the storage medium node 102 are connected by a back-end connection 105. The controllers 101A, 101B are connected to a network 106 and allow access of an external host 107 and a management host 108.

The controllers 101A, 101B allow the host 107 to access a storage mapped to a storage area of the storage medium 103.

The storage medium node 102 includes the storage medium 103 that is a mapping destination of the storage area, and allows access to the controllers 101A, 101B. The controllers 101A, 101B share the storage mediums 103 in the storage medium node 102, and any controller can directly access the storage medium 103 without passing through the other controller.

The storage medium 103 provides the storage area of the storage. The storage medium 103 is shared by the controllers 101A, 101B and accessed via the back-end connection 105.

The inter-controller connection 104 connects the controllers 101A, 101B, and provides a communication path for sharing control information and written data between the controllers at high speed.

The back-end connection 105 connects the controllers 101A, 101B and the storage medium node 102, and provides an access path to the storage medium 103 from the controllers 101A, 101B.

The network 106 connects the controllers 101A, 101B, the host 107, and the management host 108, and provides an access path to the storage system from the host 107.

The host 107 issues an access request to the storage area of the storage system provided by the controllers 101A, 101B.

The management host 108 performs an operation necessary for an update work on the controllers 101A, 101B of the storage system via the network 106.

New controllers 109A, 109B are connected to the inter-controller connection 104, the back-end connection 105, and the network 106 after start of the controller update work, receive metadata converted by the existing controllers 101A, 101B, and hand over the control of the storage system. Here, it is assumed that the new controller 109A receives the converted metadata from the existing controller 101A, and the new controller 109B receives the converted metadata from the existing controller 101B. In the present embodiment, it is assumed that the metadata is taken over from one of the existing controllers 101 to one of the new controllers 109, but for example, the metadata can also be taken over from one of the existing controllers 101 to both the new controllers 109.

The controllers 101A, 101B may be left and a further added controller may exist. The added controller is connected to the controllers 101A, 101B by the inter-controller connection 104, connected to the storage medium node 102 by the back-end connection 105, and connected to the host 107 and the management host 108 via the network 106.

Configurations of the inter-controller connection 104, the back-end connection 105, and the network 106 are not limited to configurations shown in FIG. 1, and for example, the connection of the network 106 to the controllers 101A, 101B may also serve as the inter-controller connection 104. The storage medium node 102 may be connected to the network 106, and the network 106 may also serve as the back-end connection 105.

Figure 2:
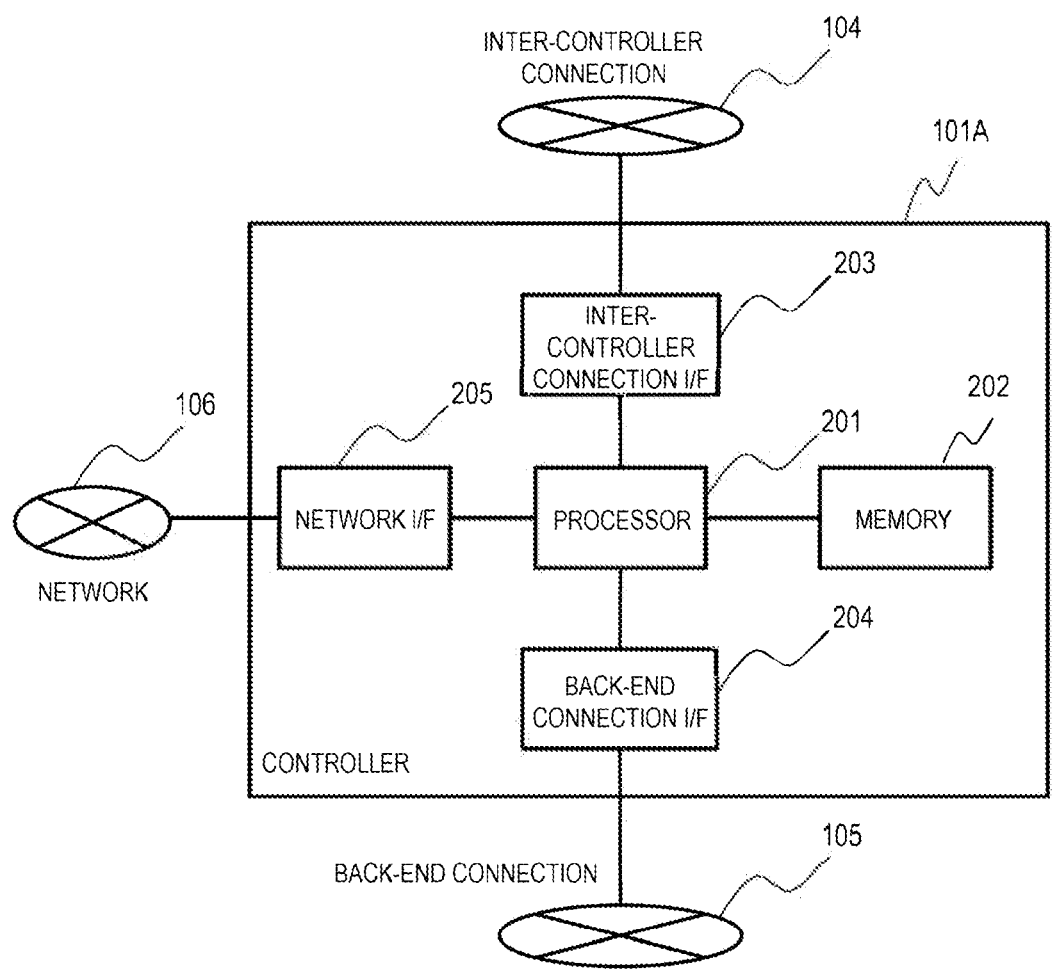
FIG. 2 is a diagram showing a configuration example of a controller in the first embodiment.

FIG. 2 is a diagram showing a configuration example of the controllers 101A, 101B and the new controllers 109A, 109B in the first embodiment. The controllers 101A, 101B may have the same configuration, and only the controller 101A is shown. The new controllers 109A, 109B may also have the same configuration as those of the controllers 101A, 101B, although the performance and capacity of individual components are different from those of the controllers 101A, 101B.

The controller 101A includes one or more processors 201, one or more memories 202, one or more inter-controller connection I/Fs 203, one or more back-end connection I/Fs 204, and one or more network I/Fs 205.

The processor 201 executes a program for realizing a controller function using the memory 202, and allows the host 107 to access a volume that is a logical storage area and a physical storage area of the storage medium 103 allocated to the volume.

The memory 202 stores the program executed in the processor 201, metadata used by the program, and data that needs to be temporarily stored.

The inter-controller connection I/F 203 is connected to the inter-controller connection 104 and performs transmission and reception related to sharing of the control information and the written data with the controller 101B.

The back-end connection I/F 204 is connected to the back-end connection 105 and performs data transmission and reception related to access to the storage medium 103 connected to the storage medium node 102.

The network I/F 205 is connected to the network 106, and is used for data transmission and reception related to the access request from the host 107 and data transmission and reception with the management host 108.

Communication standards and protocols of the inter-controller connection I/F 203, the back-end connection I/F 204, and the network I/F 205 are not particularly limited as long as the operations described above can be performed. When the network 106 also serves as the inter-controller connection 104, the network I/F 205 may be configured to further perform the operation of the inter-controller connection I/F 203. Similarly, when the network 106 also serves as the back-end connection 105, the network I/F 205 may be configured to further perform the operation of the back-end connection I/F 204.

Figure 3:
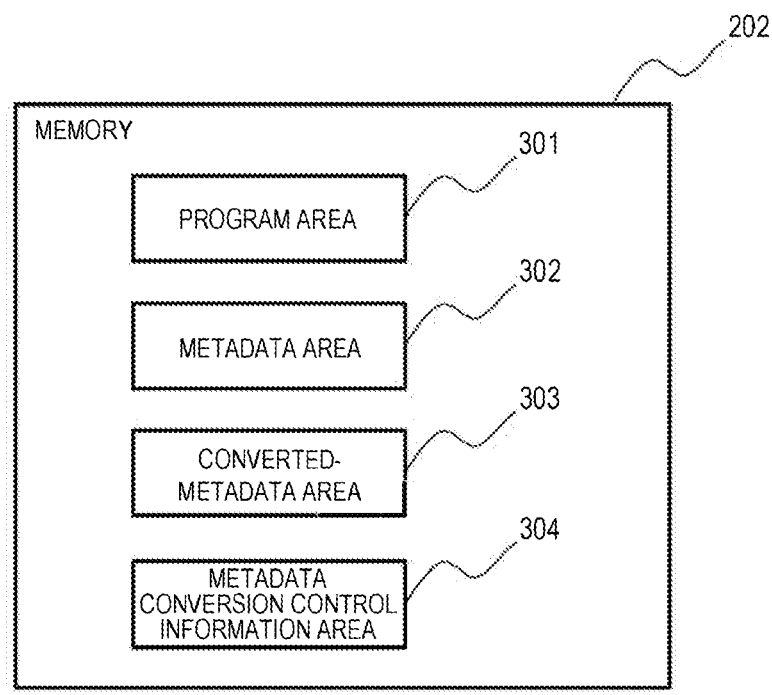
FIG. 3 is a diagram showing a configuration example of stored data in a memory of the controller in the first embodiment.

FIG. 3 is a diagram showing a configuration example of stored data of the memory 202 in the controllers 101A, 101B in the first embodiment. The memory 202 includes a program area 301, a metadata area 302, a converted-metadata area 303, and a metadata conversion control information area 304.

The program area 301 stores the program for realizing the controller function of the storage system, which is to be executed by the processor 201.

The metadata area 302 stores metadata including management information of the storage area and control information of the controller, which is to be used by the program stored in the program area 301 to control the storage system.

The converted-metadata area 303 stores metadata converted into a format usable by the new controllers 109A, 109B, which is obtained by converting the metadata stored in the metadata area 302 after the start of the controller update work.

The metadata conversion control information area 304 stores control information related to the conversion of the metadata stored in the metadata area 302 and transfer of control to the new controllers 109A, 109B.

The converted-metadata area 303 and the metadata conversion control information area 304 are not necessary before the start of the controller update work, but may be prepared in advance.

Figure 4A:
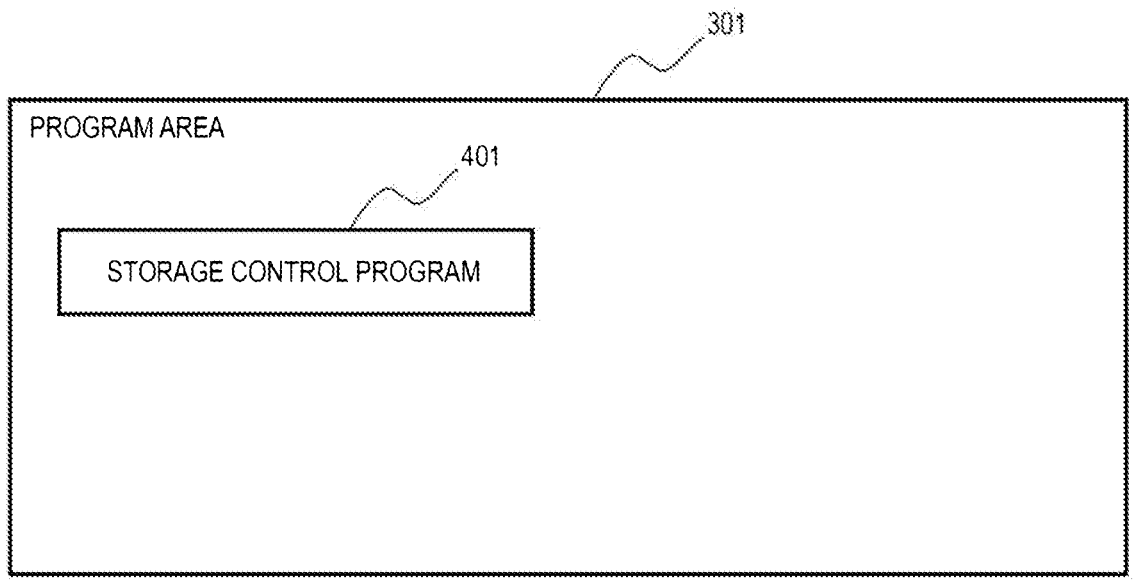
FIG. 4A is a diagram showing a configuration example of software before update stored in the memory of the controller in the first embodiment.
Figure 4B:
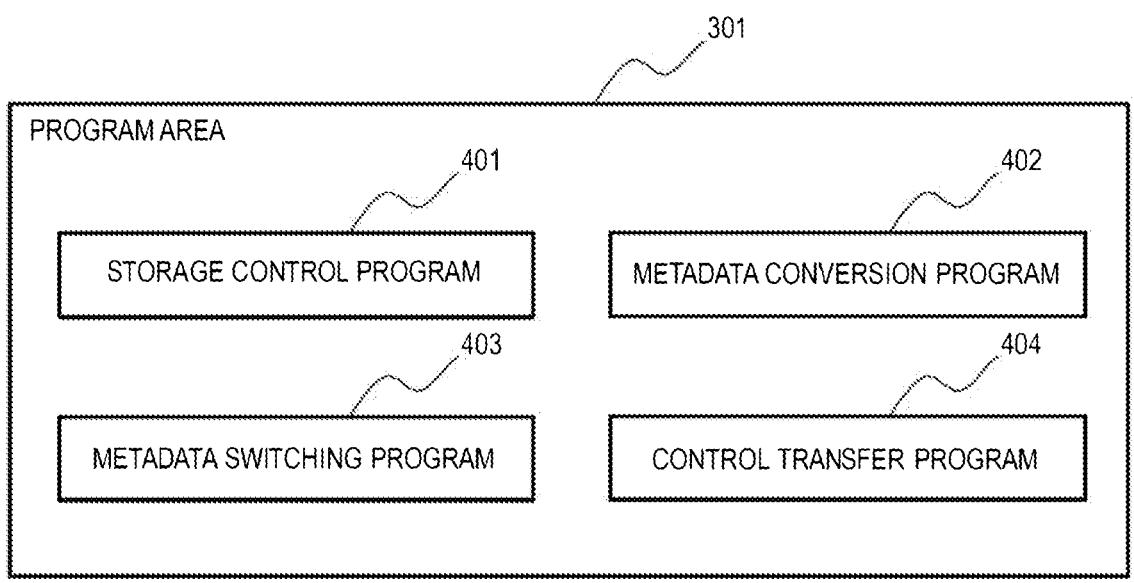
FIG. 4B is a diagram showing a configuration example of software after update stored in the memory of the controller in the first embodiment.

FIGS. 4A and 4B are diagrams showing configuration examples of the program area 301 in the memory 202 of each of the controllers 101A, 101B in the first embodiment. FIGS. 4A and 4B show configurations of the program area 301 before and after software update in an update procedure of the controllers respectively. For example, the software to be added by the update is transmitted together with a software update instruction from the management host 108. The program area 301 before software update stores a storage control program 401 as shown in FIG. 4A. As shown in FIG. 4B, the program area 301 after software update stores the storage control program 401, a metadata conversion program 402, a metadata switching program 403, and a control transfer program 404. The metadata switching program 403 is an access control code for controlling access to the metadata.

The storage control program 401 controls the entire storage system, and executes a process necessary for execution of the access request from the host 107 and management and control of the controllers 101A, 101B.

After the start of the controller update work, the metadata conversion program 402 converts the metadata to be used by the storage control program 401, which is stored in the metadata area 302 in the memory 202, into the format used by the new controllers 109A, 109B, and stores the converted metadata in the converted-metadata area 303.

After the start of the controller update work, the metadata switching program 403 is applied to a metadata access location in the storage control program 401. At the application location, the metadata switching program 403 confirms, when reading and writing the metadata, a situation of the metadata conversion performed by the metadata conversion program 402 and whether the transfer of the control of the storage system performed by the control transfer program 404 is completed.

The metadata switching program 403 determines which one of the metadata stored in the metadata area 302 and the converted-metadata area 303 the storage control program 401 is to access, and reads and writes the metadata. When the metadata switching program 403 is applied, overhead due to the determination process when accessing the metadata occurs, and the access performance of the storage system is degraded as compared with a case where the metadata switching program 403 is not applied.

After the start of the controller update work, the control transfer program 404 receives an instruction from the management host 108 via the network 106, starts the metadata conversion of the metadata conversion program 402, transfers the metadata stored in the converted-metadata area 303 from the controllers 101A, 101B to the new controllers 109A, 109B, and transfers the control of the storage system.

The metadata conversion program 402 and the control transfer program 404 are unnecessary before the start of the controller update work, but may be installed in advance.

Figure 5:
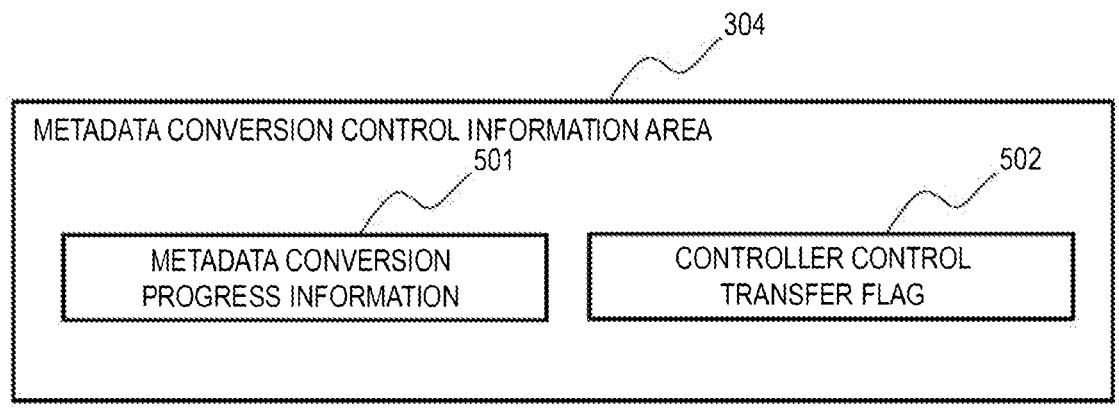
FIG. 5 is a diagram showing a configuration example of a metadata conversion control information area stored in the memory of the controller in the first embodiment.

FIG. 5 is a diagram showing a configuration example of the metadata conversion control information area 304 in the memory 202 of each of the controllers 101A, 101B in the first embodiment. The metadata conversion control information area 304 stores metadata conversion progress information 501 and a controller control transfer flag 502.

The metadata conversion progress information 501 indicates a progress situation of the conversion with respect to the metadata stored in the metadata area 302. The metadata conversion progress information 501 is updated by the metadata conversion program 402 according to progress of the metadata conversion. A format of the metadata conversion progress information 501 depends on an order of performing the conversion on the metadata, and for example, if the metadata conversion is performed in an order of addresses at which the metadata is stored, the format is represented by the address at which the metadata conversion is completed.

The controller control transfer flag 502 represents a progress situation related to the transfer of control to a new controller, and is set for all the controllers 101A, 101B by the control transfer program 404 when transferring the control from the controller 101A or 101B to the new controller 109A or 109B. The controller control transfer flag 502 may be set in a format other than a single flag indicating that the transfer of control to a new controller is completed in a certain controller, and may be represented by, for example, a set of flags indicating whether the control of the controllers 101A, 101B is transferred to the new controllers 109A, 109B.

Figure 6:
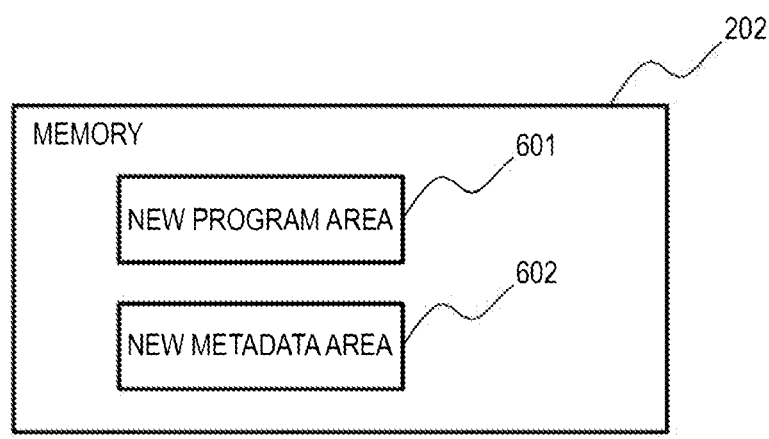
FIG. 6 is a diagram showing a configuration example of stored data in a memory of a new controller in the first embodiment.

FIG. 6 is a diagram showing a configuration example of an area of stored data of the memory 202 in each of the new controllers 109A, 109B in the first embodiment. The memory 202 includes a new program area 601 and a new metadata area 602.

The new program area 601 stores a program for realizing a new controller function of the storage system, which is executed by the processor 201 in the new controllers 109A, 109B.

The new metadata area 602 stores the metadata after conversion transmitted from the controllers 101A, 101B. The program stored in the new program area 601 starts the control of the storage system using the metadata after conversion stored in the new metadata area 602 after the control is transferred from the controllers 101A, 101B.

Figure 7:
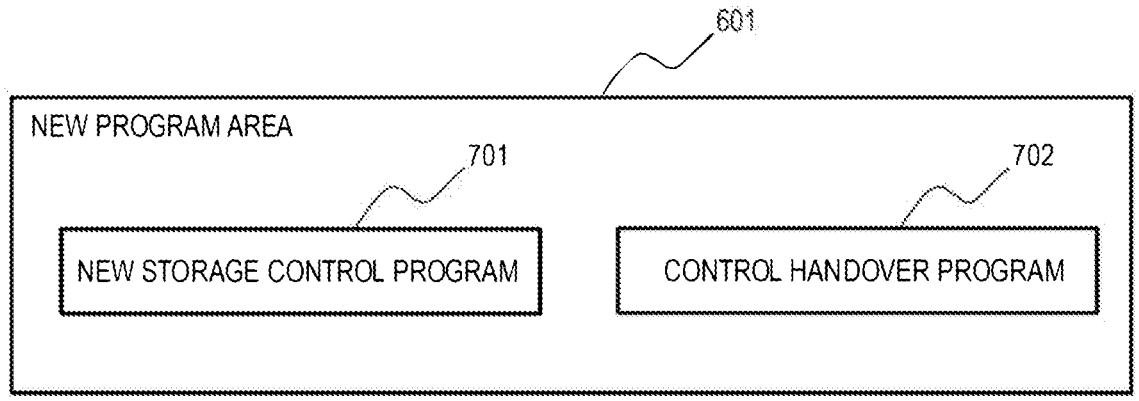
FIG. 7 is a diagram showing a configuration example of a program area stored in the memory of the new controller in the first embodiment.

FIG. 7 is a diagram showing a configuration example of the new program area 601 in the memory 202 of each of the new controllers 109A, 109B in the first embodiment.

The new program area 601 stores a new storage control program 701 and a control handover program 702.

The new storage control program 701 controls the entire storage system after the controller update and executes a process necessary for executing the access request from the host 107 and managing and controlling the new controllers 109A, 109B. The control of the storage system performed by the new storage control program 701 starts at a time point when the control is transferred from the controllers 101A, 101B in the control handover program 702.

The control handover program 702 receives the metadata after conversion from the controllers 101A, 101B, and starts the control performed by the new storage control program 701 when the control of the storage system is transferred.

Figure 8:
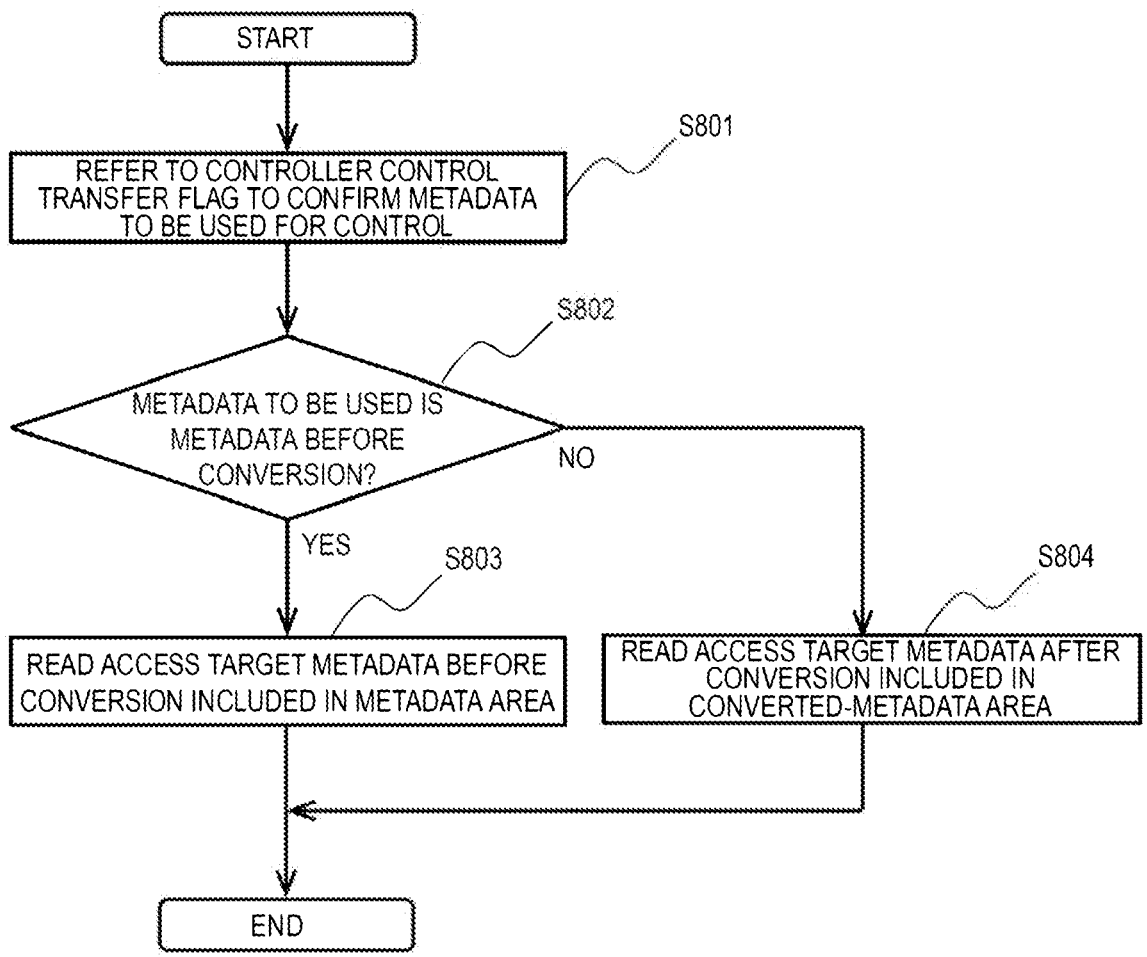
FIG. 8 is a flowchart showing a flow of a process when a storage control program of the controller reads access target metadata in a state where a metadata switching program is applied in the first embodiment.

FIG. 8 is a flowchart showing a flow of a process when the storage control program 401 of each of the controllers 101A, 101B reads access target metadata in a state where the metadata switching program 403 is applied in the first embodiment. Operations based on the flowchart shown in FIG. 8 are as follows.

Step 801: The metadata switching program 403 refers to the controller control transfer flag 502 included in the metadata conversion control information area 304 to confirm whether the metadata after conversion after the control of one of the controllers 101A, 101B is moved (transferred) to the new controllers 109A, 109B is in a valid state, and the process proceeds to step 802 subsequently.

Step 802: As a confirmation result in step 801, if the metadata before conversion is valid (if the metadata after conversion is not valid yet), the process proceeds to step 803, and if the metadata after conversion is valid, the process proceeds to step 804.

Step 803: The storage control program 401 reads, via the metadata switching program 403, access target metadata before conversion that is stored in the metadata area 302, and ends the series of operations.

Step 804: The storage control program 401 reads, via the metadata switching program 403, access target metadata after conversion that is stored in the converted-metadata area 303, and ends the series of operations. Accordingly, after the new controllers 109A, 109B start operating, the old controllers 101A, 101B can also appropriately operate together with the new controllers 109A, 109B. In the present embodiment, in order to prevent the controllers that access the metadata after conversion and the controllers that access the metadata before conversion from being mixed by the operations in the flowchart shown in FIG. 8, the transfer of the control of all the controllers may wait until the metadata conversion of all the controllers is completed.

Figure 9:
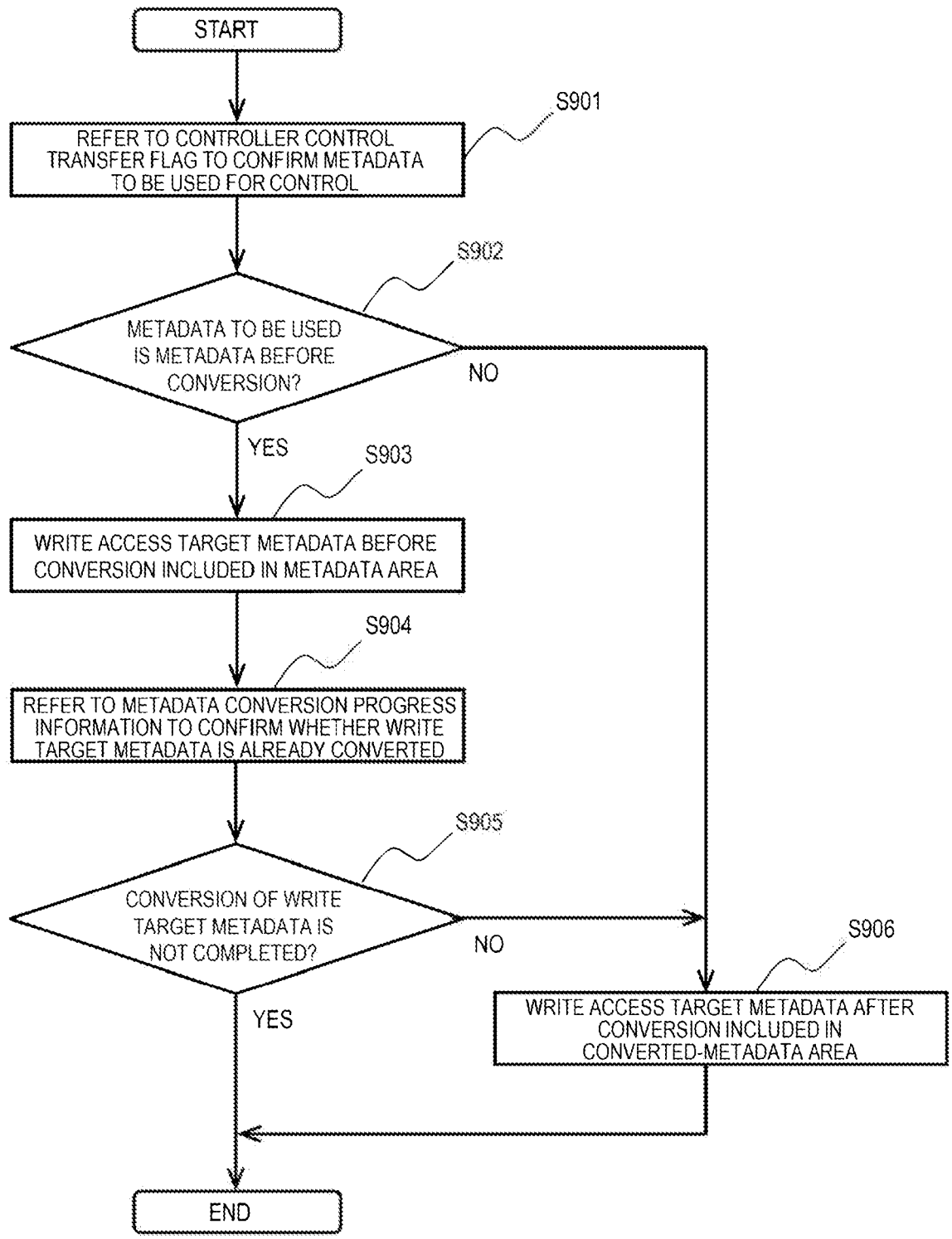
FIG. 9 is a flowchart showing a flow of a process when the storage control program of the controller writes the access target metadata in the state where the metadata switching program is applied in the first embodiment.

FIG. 9 is a flowchart showing a flow of a process when the storage control program 401 of each of the controllers 101A, 101B writes the access target metadata in the state where the metadata switching program 403 is applied in the first embodiment. Operations based on the flowchart shown in FIG. 9 are as follows.

Step 901: The metadata switching program 403 refers to the controller control transfer flag 502 included in the metadata conversion control information area 304 to confirm whether the metadata after conversion after the control of one of the controllers 101A, 101B is moved (transferred) to the new controllers 109A, 109B is in a valid state, and the process proceeds to step 902 subsequently.

Step 902: As a confirmation result in step 901, if the metadata before conversion is valid (if the metadata after conversion is not valid yet), the process proceeds to step 903, and if the metadata after conversion is valid, the process proceeds to step 906.

Step 903: The storage control program 401 writes, via the metadata switching program 403, write target metadata before conversion that is stored in the metadata area 302, and the process proceeds to step 904 subsequently.

Step 904: The metadata switching program 403 refers to the metadata conversion progress information 501 included in the metadata conversion control information area 304 to confirm whether the write target metadata is already converted by the metadata conversion program 402.

Step 905: As a confirmation result in step 904, if the conversion of the write target metadata is not completed, the series of operations is ended, and if the conversion is completed, the process proceeds to step 906.

Step 906: The storage control program 401 writes, via the metadata switching program 403, write target metadata after conversion that is stored in the converted-metadata area 303, and ends the series of operations. If the conversion of the write target metadata is not completed in step 905, the operation is ended without updating the converted-metadata area 303, and the write target metadata may be converted and stored in the converted-metadata area 303. In the present embodiment, in order to prevent the controllers that access the metadata after conversion and the controllers that access the metadata before conversion from being mixed by the operations in the flowchart shown in FIG. 9, the transfer of the control of all the controllers may wait until the metadata conversion of all the controllers is completed.

Figure 10:
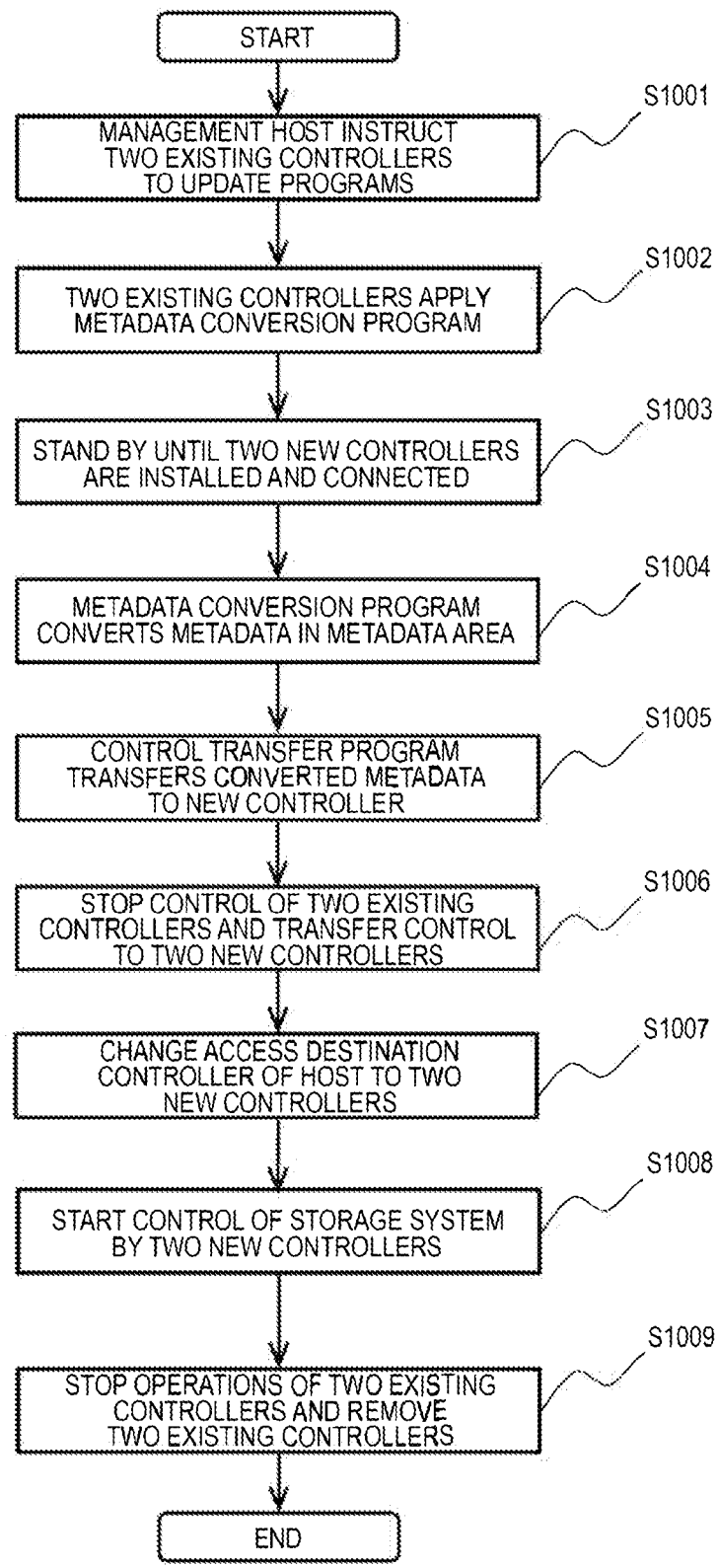
FIG. 10 is a flowchart showing a flow of a series of processes of updating the controller to a new controller in the first embodiment.

FIG. 10 is a flowchart showing a flow of the update from the controllers 101A, 101B to the new controllers 109A, 109B in the first embodiment. Operations based on the flowchart shown in FIG. 10 are as follows.

Step 1001: The management host 108 receives an instruction of starting the controller update work, and instructs the controllers 101A, 101B to update programs including the metadata conversion program 402, the metadata switching program 403, and the control transfer program 404, and the process proceeds to step 1002 subsequently. In this step, the metadata switching program 403 is not applied to the controllers 101A, 101B, and the performance degradation of the storage system due to overhead does not occur.

Step 1002: The controllers 101A, 101B apply the metadata switching program 403 to the storage control program 401 stored in the program area 301 of the memory 202, and store the metadata conversion program 402 and the control transfer program 404 in the program area 301. The controllers 101A, 101B start executing the storage control program 401 to which the metadata switching program 403 is applied, and subsequently perform step 1003. If this step is completed and the metadata switching program 403 is executed when accessing the metadata, the performance degradation of the storage system due to overhead occurs.

Step 1003: The control transfer program 404 stands by until a controller update worker installs the new controllers 109A, 109B and connects the new controllers 109A, 109B to the inter-controller connection 104, the back-end connection 105, and the network 106 similar to the controllers 101A, 101B. During the standby, the access request from the host 107 is continually processed by the updated storage control program 401. After completion of the standby, the process proceeds to step 1004.

Step 1004: The control transfer program 404 instructs the metadata conversion program 402 to start the conversion of the metadata stored in the metadata area 302. The metadata conversion program 402 converts the metadata in the metadata area 302 into a format usable by the new controllers 109A, 109B, and stores the converted metadata in the converted-metadata area 303, and the process proceeds to step 1005 subsequently. During this step, the storage control program 401 determines, by the metadata switching program 403 applied thereto, metadata to be accessed from the metadata area 302 and the converted-metadata area 303 according to the conversion situation of the metadata, and reads and writes the determined metadata.

Step 1005: The control transfer program 404 of the controller 101A transfers the metadata after conversion, which is stored in the converted-metadata area 303 by the metadata conversion program 402, to the new controller 109A through the inter-controller connection 104. The control transfer program 404 of the controller 101B transfers the metadata after conversion, which is stored in the converted-metadata area 303 by the metadata conversion program 402, to the new controller 109B through the inter-controller connection 104. The control handover program 702 of each of the new controllers 109A, 109B stores the received metadata in the new metadata area 602 of the memory 202, and the process proceeds to step 1006 subsequently.

Step 1006: When the transfer of the metadata after conversion to the new controllers 109A, 109B is completed, the control transfer program 404 stops processing the access request from the host 107 in the storage control program 401, and transfers the control of the storage system to the new controllers 109A, 109B through the inter-controller connection 104. The transfer of the metadata after conversion and the transfer of the control may be independently performed between two pairs of the new and old controllers, or the transfer of the control of the two controller pairs may be performed after the transfer of the metadata after conversion in both the controllers 101A, 101B is completed. The control transfer program 404 notifies the management host 108 that the control is transferred to the new controllers 109A, 109B, and the process proceeds to step 1007 subsequently.

Step 1007: The management host 108 changes an access destination controller in the storage system for the host 107 from the controllers 101A, 101B to the new controllers 109A, 109B, and the process proceeds to step 1008 subsequently.

Step 1008: The control handover program 702 of each of the new controllers 109A, 109B starts the control performed by the new storage control program 701 to hand over the control of the storage system, and the process proceeds to step 1009 subsequently. Since the new storage control program 701 of each of the new controllers 109A, 109B does not include determination of the access destination metadata, the performance degradation of the storage system due to overhead does not occur.

Step 1009: The controllers 101A, 101B stop operating and are removed from the inter-controller connection 104, the back-end connection 105, and the network 106 by the controller update worker, thereby ending the series of operations.

In the operations of steps 1005 and 1006, a path for communication between the controllers 101A, 101B and the new controllers 109A, 109B is not limited to the inter-controller connection 104, and the back-end connection 105 or the network 106 may be used. The transfer of the metadata in step 1005 may be performed by, for example, a method of transmitting the metadata, that is converted, at any time rather than transmitting at once after the conversion of the metadata in step 1004 is completed.

According to the present embodiment, in a storage system including a plurality of controllers, when the controllers are updated while allowing the host to access, it is possible to avoid the occurrence of performance degradation other than during the update work.

Second Embodiment

The present embodiment describes an example in which in a storage system including a plurality of controllers sharing storage mediums, the controllers are updated without stopping access from a host. Similar to the first embodiment, it is assumed used that the storage mediums of the storage system are continuously as they are even after the controllers are updated. In addition, in the description of the present embodiment, differences in configuration and operation with the first embodiment will be mainly described, and components, symbols, and operations that are not described are the same as those in the first embodiment.

Figure 11:
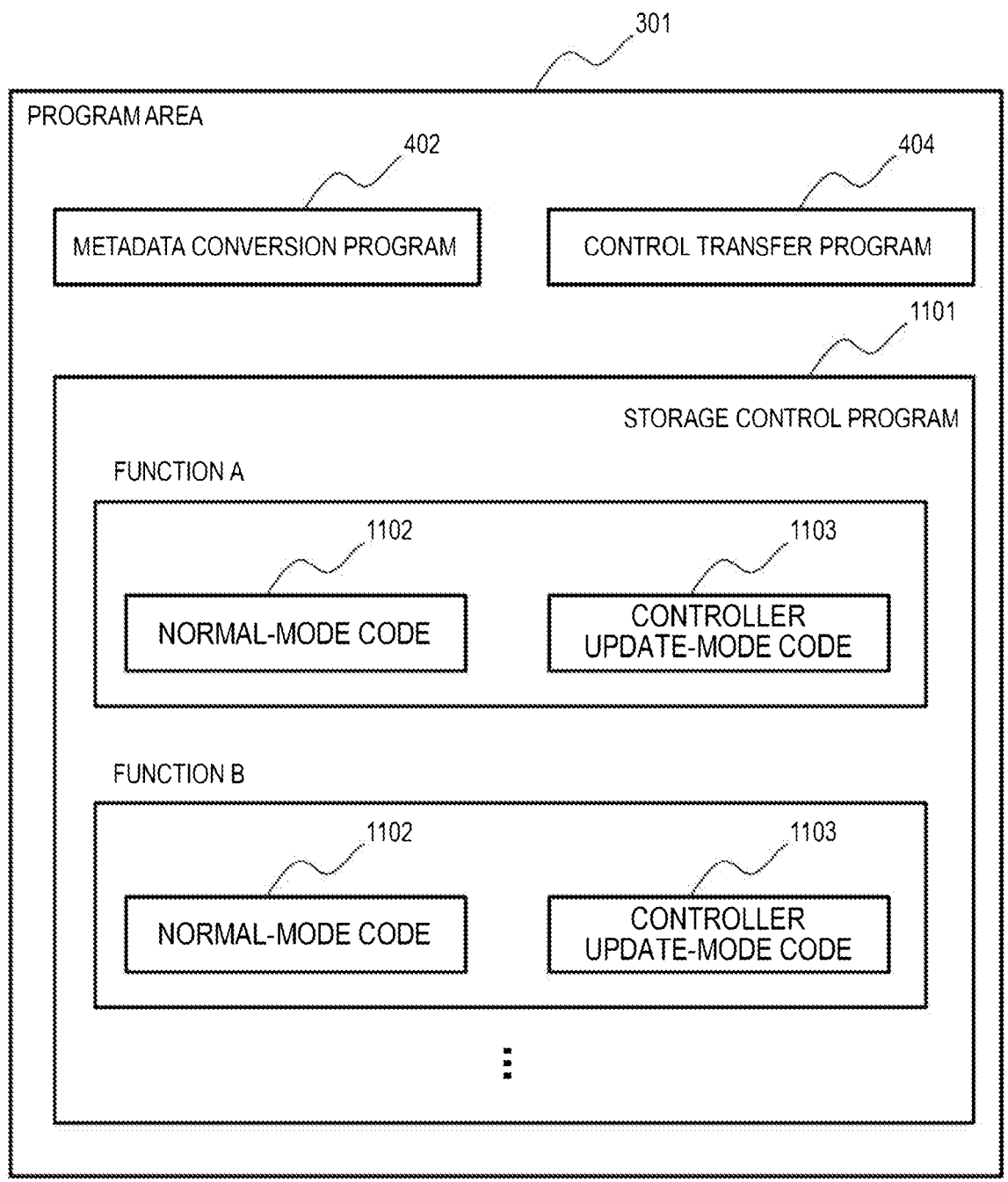
FIG. 11 is a diagram showing a configuration example of the program area stored in the memory of the controller in a second embodiment.

FIG. 11 is a diagram showing a configuration example of the program area 301 in the memory 202 of each of the controllers 101A, 101B in the second embodiment. The program area 301 stores a storage control program 1101, normal-mode codes 1102 (first code) and controller update-mode codes 1103 (second code) that constitute the storage control program 1101, the metadata conversion program 402, and the control transfer program 404.

The storage control program 1101 controls the entire storage system, and executes a process necessary for execution of the access request from the host 107 and management and control of the controllers 101A, 101B. The storage control program 1101 includes, corresponding to processes associated with accessing the metadata, the normal-mode code 1102 that is executed other than during the controller update work and the controller update-mode code 1103 that is executed only during the controller update work. During the execution of processes of the normal-mode code 1102 and the controller update-mode code 1103, the storage control program 1101 confirms whether the controller update work is being performed, executes the controller update-mode code 1103 only during the controller update work, and otherwise, executes the normal-mode code 1102, thereby reducing the performance degradation of the storage system due to overhead.

The normal-mode code 1102 is a code for executing the process of the storage control program 1101. The normal-mode code 1102 is prepared for the process associated with accessing the metadata, and directly reads and writes the metadata stored in the metadata area 302 of the memory 202 without determining the access destination metadata when accessing the metadata. The normal-mode code 1102 for each process of the management and the control of the controllers 101A, 101B is executed by the storage control program 1101 in a case other than during the controller update work.

The controller update-mode code 1103 is a part of the code for executing the process of the storage control program 1101, and is prepared together with the normal-mode code 1102 for the process associated with accessing the metadata. The controller update-mode code 1103 includes an access control code for controlling access destination metadata.

The controller update-mode code 1103 selects access destination metadata from the metadata stored in the metadata area 302 and the metadata stored in the converted-metadata area 303 of the memory 202 in response to the situation of the metadata conversion performed by the metadata conversion program 402 and whether the transfer of the control of the storage system is completed by the control transfer program 404. The controller update-mode code 1103 for each process of the management and the control of the controllers 101A, 101B is associated with overhead corresponding to the process of selecting the access destination metadata, and thus being executed only during the controller update work.

In the present embodiment, since the control software is not updated during the update work of the controllers 101A, 101B, the metadata conversion program 402 and the control transfer program 404 are prepared in advance before the start of the controller update work.

Figure 12:
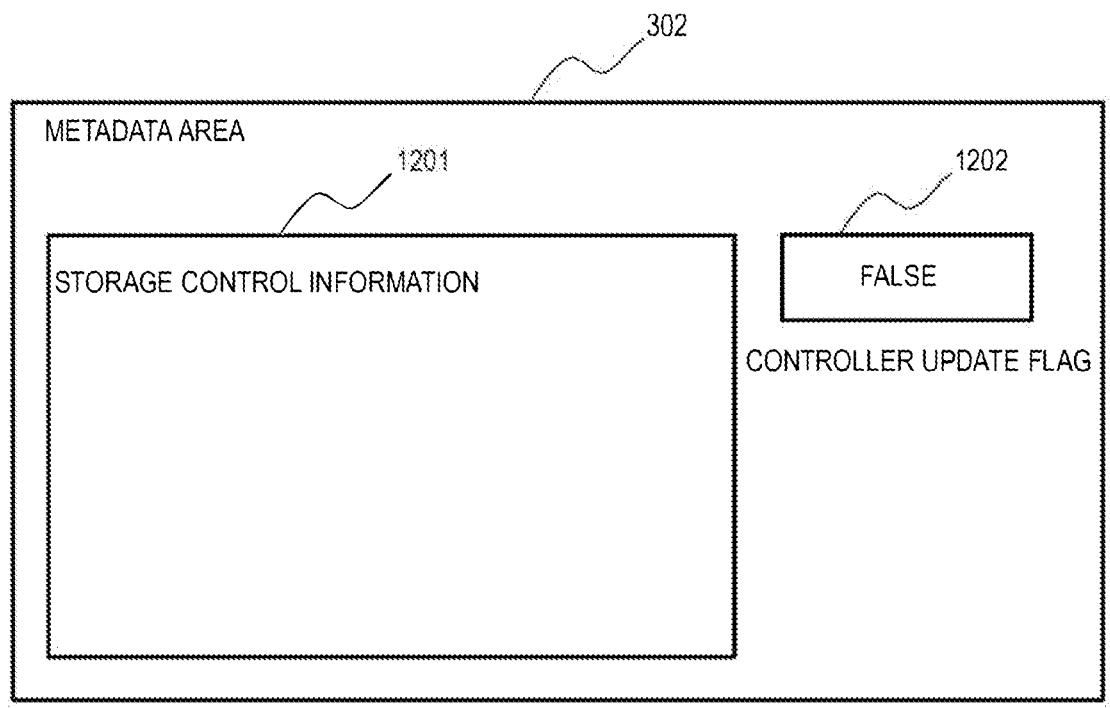
FIG. 12 is a diagram showing a configuration example of a metadata area stored in the memory of the controller in the second embodiment.

FIG. 12 is a diagram showing a configuration example of the metadata area 302 in the memory 202 of each of the controllers 101A, 101B in the second embodiment. The metadata area 302 stores storage control information 1201 and a controller update flag 1202.

The storage control information 1201 is storage area management information and controller control information used for controlling the storage system.

The controller update flag 1202 shows whether the controller update work is being performed and is set in response to the reception of the instruction of starting the controller update work from the management host 108.

Figure 13:
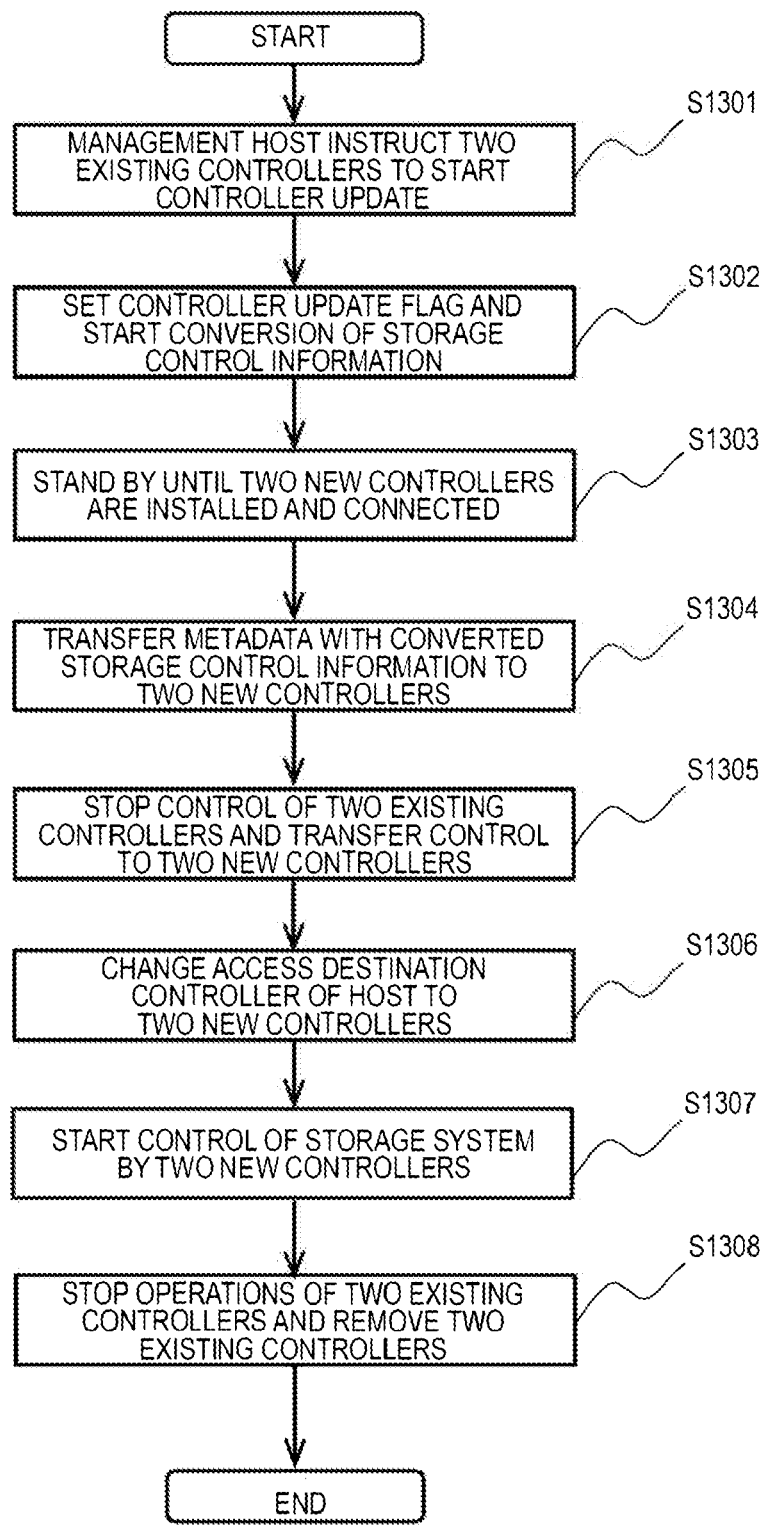
FIG. 13 is a flowchart showing a flow of a series of processes of updating the controller to the new controller in the second embodiment.

FIG. 13 is a flowchart showing a flow of update from the controllers 101A, 101B to the new controllers 109A, 109B in the second embodiment. Operations based on the flowchart shown in FIG. 13 are as follows.

Step 1301: The management host 108 receives an operation of starting the controller update work, and instructs the controllers 101A, 101B to start controller update, and the process proceeds to step 1302 subsequently.

Step 1302: When receiving the instruction of starting the controller update from the management host 108, the control transfer program 404 of each of the controllers 101A, 101B sets the controller update flag 1202 included in the metadata area 302 of the memory 202. The metadata conversion program 402 starts the conversion of the storage control information 1201 stored in the metadata area 302. Therefore, the controller update flag 1202 indicates the start of the conversion. The metadata conversion program 402 converts the storage control information 1201 into a format usable by the new controller 109A, 109B, and stores the converted information in the converted-metadata area 303, and the process proceeds to step 1303 subsequently.

Step 1303: The control transfer program 404 stands by until the new controllers 109A, 109B are finished to install and connect to the inter-controller connection 104, the back-end connection 105, and the network 106, similar to the controllers 101A, 101B. During the standby, the access request from the host 107 is continually processed by the storage control program 1101. After completion of the standby, the process proceeds to step 1304.

Step 1304: The control transfer program 404 transfers the metadata after conversion, which is stored in the converted-metadata area 303 by the metadata conversion program 402, to the new controllers 109A, 109B through the inter-controller connection 104. The control handover program 702 of each of the new controllers 109A, 109B stores the received metadata in the new metadata area 602 of the memory 202, and the process proceeds to step 1305 subsequently.

Step 1305: When the transfer of the metadata after conversion to the new controllers 109A, 109B is completed, the control transfer program 404 stops processing the access request from the host 107 in the storage control program 1101, and transfers the control of the storage system to the new controllers 109A, 109B through the inter-controller connection 104. The control transfer program 404 notifies the management host 108 that the control is transferred to the new controllers 109A, 109B, and the process proceeds to step 1306 subsequently.

Step 1306: The management host 108 changes the access destination controller in the storage system for the host 107 from the controllers 101A, 101B to the new controllers 109A, 109B, and the process proceeds to step 1307 subsequently.

Step 1307: The control handover program 702 of each of the new controllers 109A, 109B starts the control performed by the new storage control program 701 to hand over the control of the storage system, and the process proceeds to step 1308 subsequently. Since the new storage control program 701 of each of the new controllers 109A, 109B does not include the determination of the access destination metadata, the performance degradation of the storage system due to overhead does not occur.

Step 1308: The controllers 101A, 101B stop operating and are removed from the inter-controller connection 104, the back-end connection 105, and the network 106 by the maintainer of the storage controller, thereby ending the series of operations.

In the operations of steps 1304 and 1305, a path for communication between the controllers 101A, 101B and the new controllers 109A, 109B is not limited to the inter-controller connection 104, and the back-end connection 105 or the network 106 may be used.

Figure 14:
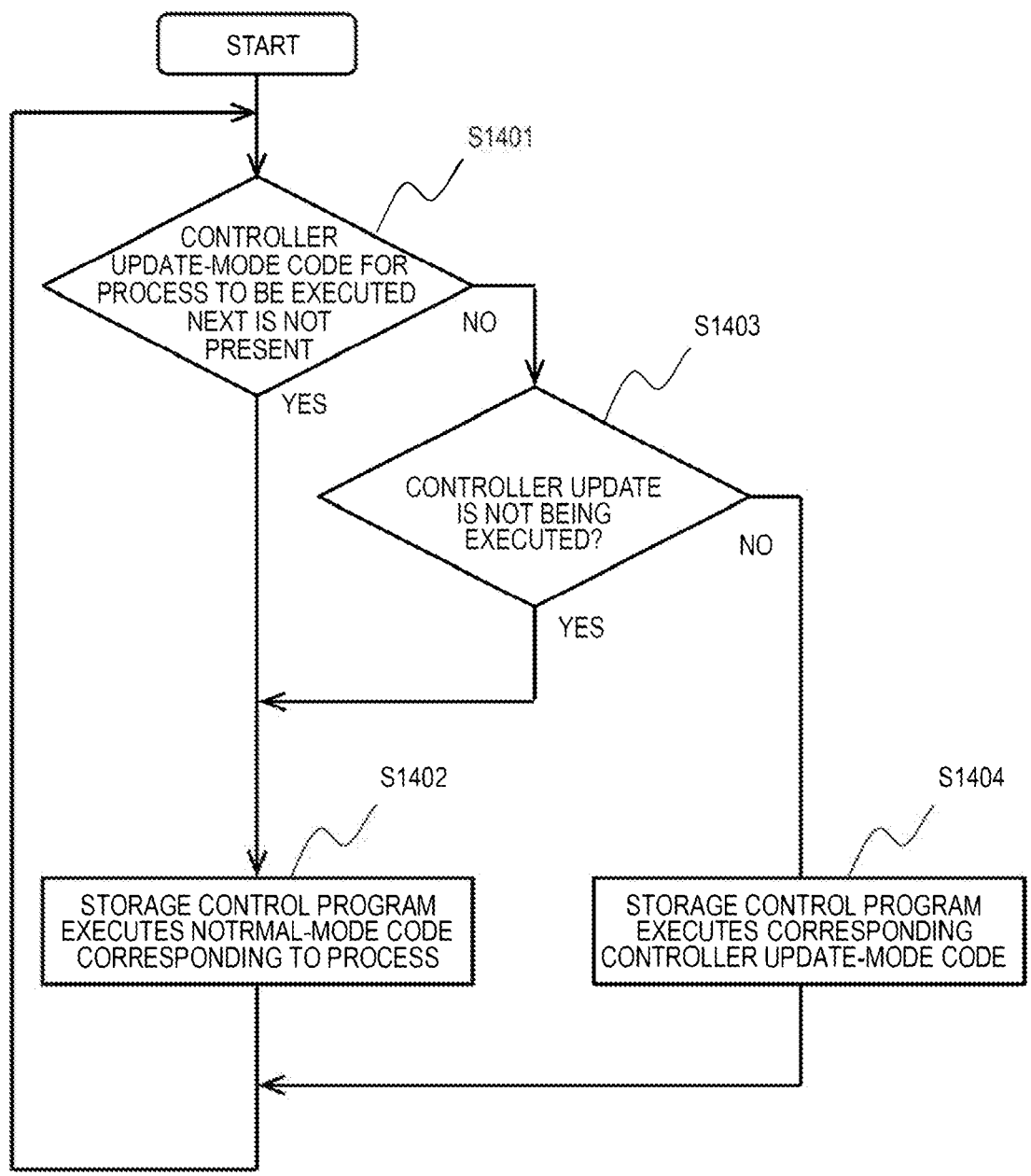
FIG. 14 is a flowchart showing a flow of a series of processes of executing a code of a control process in the controller in the second embodiment.

FIG. 14 is a flowchart showing a flow that the storage control program 1101 executes control codes in the controllers 101A, 101B in the second embodiment. Operations based on the flowchart shown in FIG. 14 are as follows.

Step 1401: The storage control program 1101 performs step 1402 if the controller update-mode code 1103 for a process to be executed next does not present, and performs step 1403 if the controller update-mode code 1103 for the process to be executed next is present.

Step 1402: The storage control program 1101 executes the normal-mode code 1102 corresponding to the process to be executed next, and the process proceeds to step 1401 subsequently.

Step 1403: The storage control program 1101 refers to the controller update flag 1202 included in the metadata area 302 of the memory 202, and confirms whether the controllers 101A, 101B are executing the controller update. As a result, the storage control program 1101 performs step 1402 if the controller update is not being executed, and performs step 1404 if the controller update is being executed.

Step 1404: The storage control program 1101 executes, in the process to be executed next, the controller update-mode code 1103 to which an access destination metadata selection function is applied in the metadata access, and the process proceeds to step 1401 subsequently.

According to the present embodiment, in the storage system including a plurality of controllers, when the controller is updated while allowing the host to access, it is possible to reduce the performance degradation other than during the update work.

What is claimed is:

1. A storage system, comprising:
   a controller, wherein
   the controller includes
      one or more processors, and
      one or more memories configured to store one or more programs to be executed by the one or more processors,
   the one or more processors are configured to:
      convert first metadata for controlling the storage system into second metadata, wherein the second metadata is in a format that corresponds to a new controller newly installed in the storage system,
      execute control of switching an access destination between the first metadata and the second metadata according to an access control code during the conversion, and
      access the first metadata without using the access control code before start of the conversion.

2. The storage system according to claim 1, wherein after the conversion is completed and the second metadata is transmitted to the new controller, the one or more processors determine to access the second metadata according to the access control code.

3. The storage system according to claim 2, wherein the one or more processors read the first metadata according to the access control code during the conversion.

4. The storage system according to claim 2, wherein during the conversion, the one or more processors
   update a part of the first metadata,
      determine, according to the access control code, whether the part of the first metadata is already converted, and
      update, when the part of the first metadata is already converted, a portion of the second metadata corresponding to the part of the first metadata.

5. The storage system according to claim 1, wherein the one or more processors
   execute, before the start of the conversion, first software from which the access control code is excluded, to access the metadata, and
   update the first software to second software including the access control code, and start the conversion according to the second software.

6. The storage system according to claim 1, wherein the one or more processors execute a storage control program to process a host request,
   the storage control program includes a first code and a second code each corresponding to one process,
   the first code does not include the access control code, but the second code includes the access control code,
   the one or more processors access the first metadata according to the first code,
   the one or more processors access one selected from the first metadata and the second metadata according to the second code,
   the one or more memories store a flag for managing the start of the conversion, and
   the one or more processors refer to the flag during execution of the one process and determine which of the first code and the second code is to be used.

7. A method for controlling a storage system, the storage system including a controller, the controller including one or more processors and one or more memories configured to store one or more programs to be executed by the one or more processors, the control method, with the one or more processors, comprising:
   converting first metadata for controlling the storage system into second metadata, wherein the second metadata is in a format that corresponds to a new controller newly installed in the storage system;
   executing control of switching an access destination between the first metadata and the second metadata according to an access control code during the conversion; and
   accessing the first metadata without using the access control code before start of the conversion.

* * * * *